United States Patent [19]

Houston et al.

[11] Patent Number: 5,456,818
[45] Date of Patent: Oct. 10, 1995

[54] METHOD FOR PREVENTING FRETTING AND GALLING IN A POLYGON COUPLING

[75] Inventors: Russell A. Houston, Mayfield; Louis Chiang, Paducah, both of Ky.

[73] Assignee: Ingersoll-Rand Company, Woodcliff Lake, N.J.

[21] Appl. No.: 307,536

[22] Filed: Sep. 16, 1994

Related U.S. Application Data

[63] Continuation of Ser. No. 147,225, Nov. 3, 1993, abandoned.

[51] Int. Cl.⁶ ............... C25D 5/02; C25D 5/34; C25D 7/04
[52] U.S. Cl. ............. 205/131; 205/151; 205/156; 205/209
[58] Field of Search .................... 205/131, 151, 205/156, 209, 283; 427/436, 437, 250, 251, 252, 253, 376.8, 383.7, 229, 576, 455, 191; 428/667, 609; 403/383

[56] References Cited

U.S. PATENT DOCUMENTS

| | | | |
|---|---|---|---|
| 2,048,578 | 7/1936 | Van de Horst | 204/8 |
| 2,702,785 | 2/1955 | Eyerund et al. | 204/33 |
| 3,734,548 | 5/1973 | Kieves | 287/53 R |
| 3,749,652 | 7/1973 | Eisner | 205/283 |
| 3,888,746 | 6/1975 | Uy et al. | 204/36 |
| 4,176,434 | 12/1979 | Cromwell et al. | 29/156.63 |
| 4,185,937 | 1/1980 | Anderson | 403/383 |
| 4,279,706 | 7/1981 | Blanc et al. | 204/26 |
| 4,294,562 | 10/1981 | Mullenberg | 403/383 |
| 4,294,670 | 10/1981 | Raymond | 204/26 |
| 4,474,651 | 10/1984 | Yauchi et al. | 205/131 |
| 4,865,700 | 9/1989 | Sovran et al. | 204/51 |
| 5,110,421 | 5/1992 | Gabrielson | 205/131 |
| 5,122,256 | 6/1992 | Waskiewicz | 205/135 |

OTHER PUBLICATIONS

Chromium Corporation of America: Chromium Plating CRODON pp. 1–24 (1937) no month.
Hyman Chessin & Everett Fernald, Jr. "Hard Chromium Plating" (no date).
Walter P. Waskiewicz, SAE Technical Paper Series 841124, "Extending Bearing Life in Off–Highway Equipment" Sep. 1984.

Primary Examiner—John Niebling
Assistant Examiner—Edna Wong
Attorney, Agent, or Firm—Victor M. Genco, Jr.; John J. Selko

[57] ABSTRACT

A method of preventing galling between first and second metallic surfaces which are disposed in contacting, substantially stationary relation, one to each other, includes coating at least one of the first and second metallic surfaces with a layer of hard chromium plating.

2 Claims, 2 Drawing Sheets

METHOD FOR PREVENTING FRETTING AND GALLING IN A POLYGON COUPLING

This application is a continuation of application Ser. No. 08/147,225 filed Nov. 3, 1993, now abandoned.

BACKGROUND OF THE INVENTION

This invention generally relates to a method of preventing wear, and more particularly to a method of preventing fretting and galling in a metallic coupling, such as but not limited to a polygon coupling.

Polygon shaft couplings are generally known. For example, this type shaft coupling is described in U.S. Pat. No. 4,294,562. Typically, in such couplings, a shaft and a hub have cross sections fitting into each other, and these cross sections deviate from a circular pattern and have shapes that are convex on all sides and essentially elliptical, triangular or quadratic.

In a use of this type polygon coupling in centrifugal compressor design, an impeller of a centrifugal compressor is operatively connected to a centrifugal compressor driving shaft or pinion. In such a design, the compressor impeller includes a polygonally dimensioned male hub portion, and the compressor pinion includes a suitably dimensioned bore which receives the male hub portion of the compressor impeller. Although this type polygon coupling has been used with success in centrifugal compressor design, this polygon coupling is susceptible to galling and fretting. More particularly, galling has been known to occur between the two mating polygon surfaces of the hub portion of the impeller and the interior wall of the polygonally dimensioned bore of the pinion. Additionally, fretting has been known to occur at an annular shoulder region between the pinion and the impeller.

As used herein, galling means a type of adhesive wear which is caused by an imbalance of electrons existing between two mating metal surfaces. In this regard, when material is subject to galling under low stresses, minute junctions form at contacting surfaces and small fragments of the metals become detached with subsequent movement. When material is subject to galling under high stresses, large junctions are formed, or actual seizure may occur between the materials. In a polygon coupling of the type described hereinabove, there generally exists high stresses between the impeller and the pinion. When galling occurs between the impeller and the pinion, the impeller may become difficult to remove from the pinion. In cases when the impeller actually seizes on the pinion, the impeller must be cut therefrom to perform any required maintenance or compressor servicing.

As used herein, fretting means surface damage caused by low amplitude, but high frequency sliding between two contacting surfaces. In the polygon shaft coupling between the impeller and the centrifugal compressor pinion, fretting generally causes the annular shoulder region between the pinion and the impellar to fatigue and to wear prematurely.

The foregoing illustrates limitations known to exist in metallic couplings in general, and in particular, in a metallic polygon coupling having a pinion and an impeller, such as in a centrifugal compressor. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, this is accomplished by providing a method of preventing galling between first and second metallic surfaces which are disposed in contacting, substantially stationary relation, one to each other, and wherein the method includes coating at least one of the first and second metallic surfaces with a layer of hard chromium plating.

In another aspect of the present invention a coupling includes a first metallic coupling member having a polygonally dimensioned bore defined by an interior bore surface, and a second metallic coupling member having a mating, polygonally dimensioned stem, which is defined by an exterior stem surface, and which is received by the bore. A coating of hard chromium is deposited on at least one of the polygonal surfaces of the first metallic coupling member and the second metallic coupling member to prevent galling between the two surfaces.

In another aspect of the present invention, a method of preventing fretting between first and second metallic surfaces which are disposed in contacting, substantially stationary relation, one to each other, includes coating at least one of the first and second metallic surfaces with a layer of hard chromium plating, or otherwise positioning a layer of hard chromium between the first and second metallic surfaces.

The foregoing and other aspects will become apparent from the following detailed description of the invention when considered in conjunction with the accompanying drawing figures.

BRIEF DESCRIPTION OF THE DRAWING FIGURES

DETAILED DESCRIPTION

Figure 1:
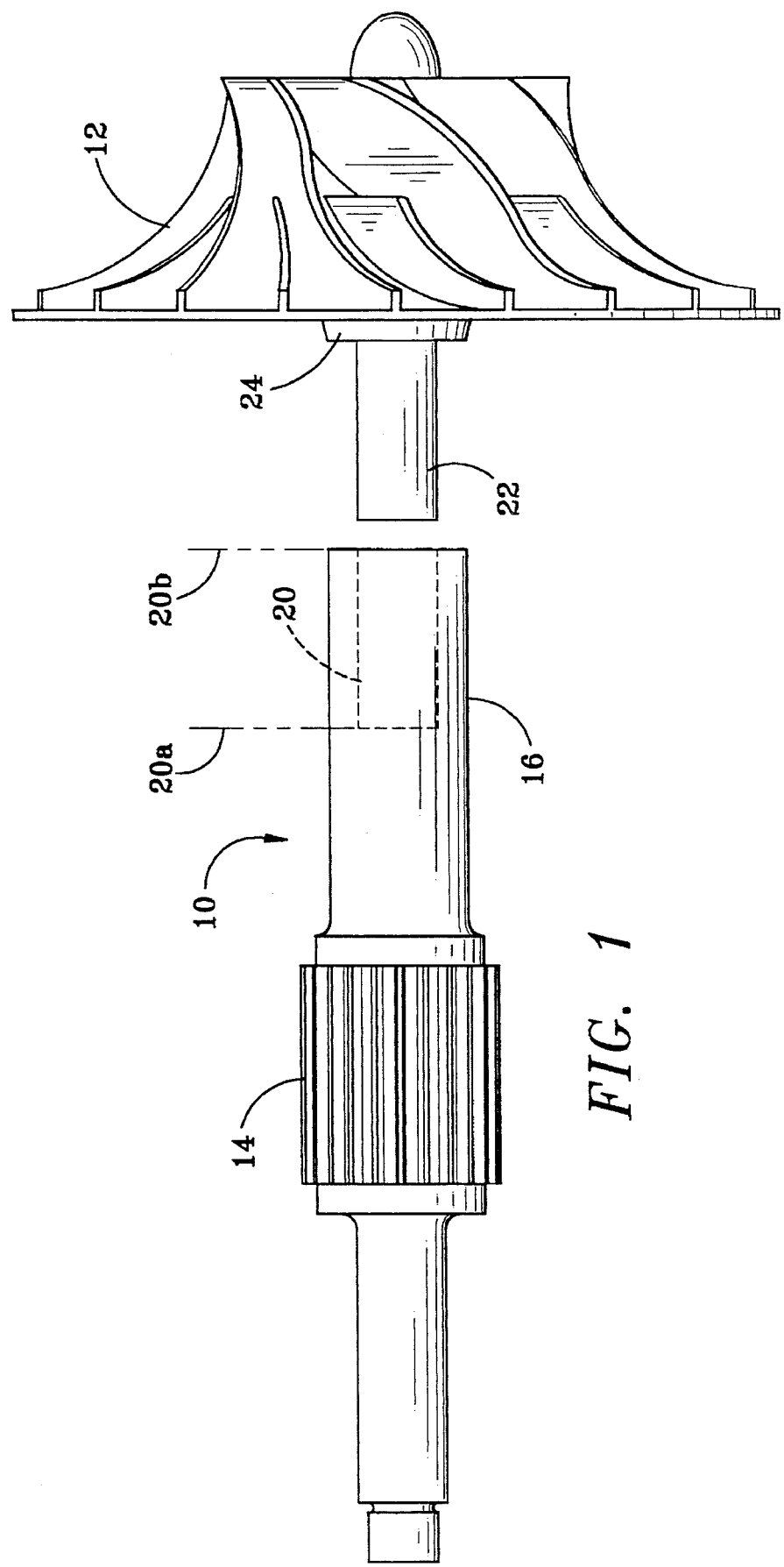
FIG. 1 is an exploded view of a pinion and an impeller for a centrifugal compressor.

Referring now to the drawings, wherein similar reference characters designate corresponding parts throughout the several views, FIG. 1 illustrates a pinion 10 and an impeller 12 which are designed to be employed in a centrifugal compressor (not shown).

Figure 3:
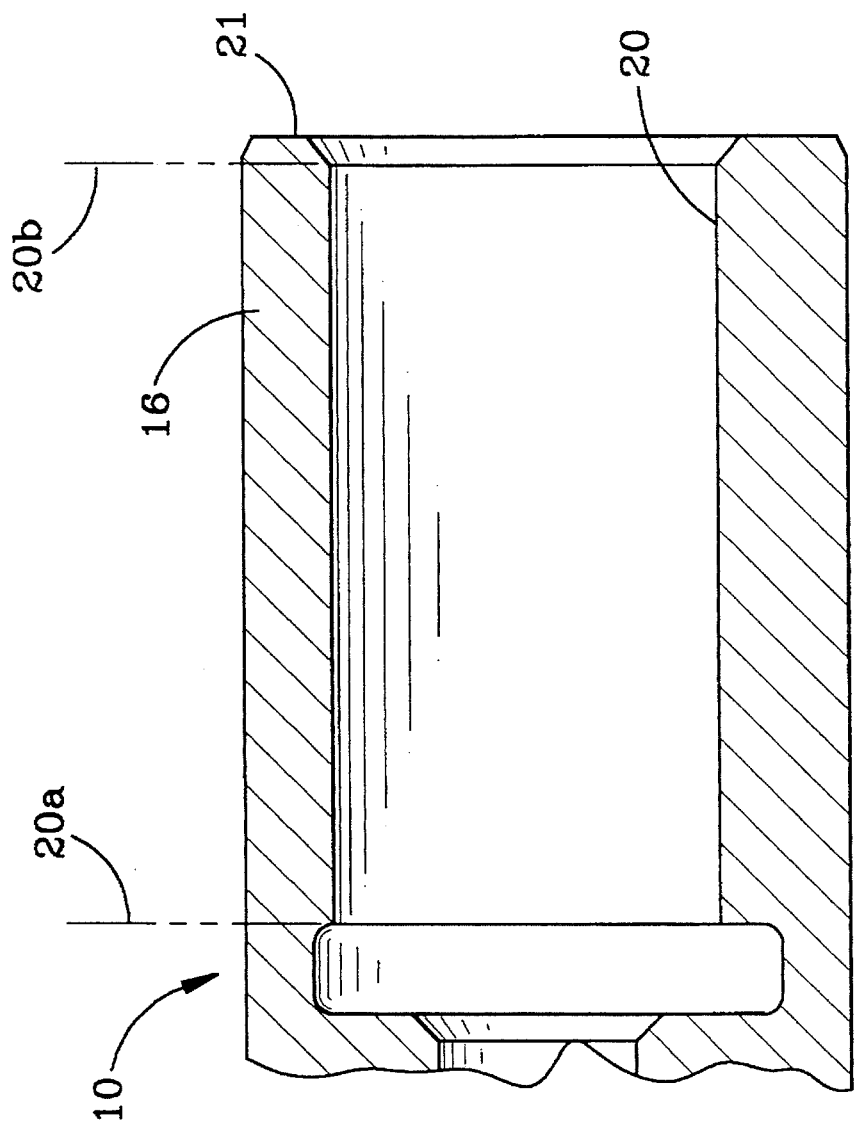
FIG. 3 is a partial, sectional view of an end bore portion of the pinion which is conformably dimensioned to receive the stem portion of the impeller.
Figure 2:
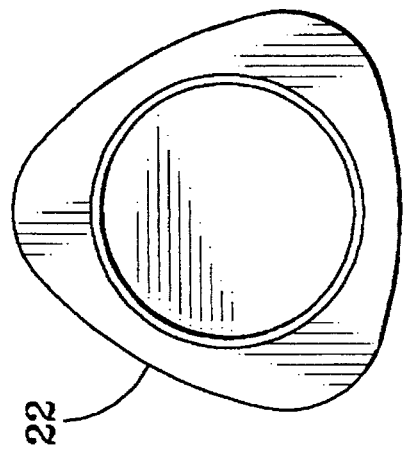
FIG. 2 is an end view of a polygonally dimensioned stem portion of the impeller of FIG. 1.

The pinion 10 includes gearing 14 which is engageable with a power transmission assembly (not shown) which drives the pinion about a pinion axis at a predetermined rotational velocity during operation of the centrifugal compressor. The pinion 10 typically is manufactured from alloy steel, such as but not limited to, AMS 6260 or AISI 8620 alloy steel. The pinion 10 includes a driving end 16 which is illustrated in section in FIG. 3. The driving end 16 has formed therein a polygonally dimensioned bore 20 extending from a location 20A to a location 20B. The polygonally dimensioned bore 20 has an interior bore surface which defines a generally triangular cross section composed of circular arcs. As best illustrated in FIG. 3, the driving end 16 includes an annular surface 21 which surrounds the polygonally dimensioned bore 16.

The impeller 12 incorporates a backward-leaning type geometry, and the impeller includes a polygonally dimensioned stem or stem portion 22 which is defined by an exterior stem surface. The polygonally dimensioned stem 22 is suitably matingly dimensioned to be received by the polygonally dimensioned bore 20, as best illustrated by FIG.

2. Also, formed on the impeller 12 is a shoulder or shoulder portion 24.

Typically, the impeller 12 is manufactured from an investment cast stainless steel, such as but not limited to, 15-5 PH or 17-4 PH alloy steel. When the pinion 10 and the impeller 12 are coupled, the fit between the polygonal bore 20 and the polygonal stem 22 provides for positive coupling locking between the pinion and the impeller. This polygonal coupling design permits the impeller 12 to be easily assembled on, or easily disassembled from, the pinion 10 and the centrifugal compressor. When properly coupled, the interior surface of the polygonal bore 20 and the exterior surface of the polygonal stem 22 are disposed in contacting, substantially stationary relation, one to each other. Additionally, and when properly coupled, the shoulder portion 24 and the annular surface 21 are also disposed in contacting, substantially stationary relation with respect to each other.

It is known that the materials used to manufacture the pinion 10 and the impeller 12, i.e. type AMS 6260 and AISI 8620 alloy steel, and type 15-5 PH and 17-4 PH stainless steel, are susceptible to galling under certain operation applications. In this regard, it has been discovered that galling may occur between the interior surface of the polygonal bore 20 and the exterior surface of the polygonal stem portion 22. The preferred embodiment of the present invention is suitable for preventing galling between the respective surfaces of the pinion 10 and the impeller 12. As described in further detail hereinafter, it has been discovered that coating at least one of the polygonal surfaces of either the polygonal bore 20 or the polygonal stem 22 with a layer of hard chromium plating substantially eliminates any galling which may occur between the polygonal surfaces. Additionally, it has been discovered that the method of the present preferred embodiment can substantially eliminate galling between any first and second metallic surfaces which are disposed in contacting, substantially stationary relation, one to each other.

Hard chromium plating is generally known in the art. Various methods for selectively coating surfaces with hard chromium plating are described in U.S. Pat. Nos. 5,110,421 and 5,122,256 which are incorporated herein by reference. In the preferred embodiment, the hard chromium plating is deposited as a coating layer on the interior surface of the polygonally dimensioned bore 20 by methods which are generally known in the art, such as but not limited to, electrodeposition. A hard chromium plating which is particularly effective for preventing galling in the preferred embodiment is a thin dense chrome plating which is provided by the Torrington Division of the Ingersoll-Rand Company. The Torrington Division is headquartered in Torrington, CT.

The hard chromium plating is deposited on the interior surface of the bore 20 in a layer having a thickness ranging from about 0.0001 inch to about 0.0002 inch. A layer of hard chromium having such a thickness is flexible enough not to crack or flake under the loads which are generated between the pinion 10 and the impeller 12. Also, it has been discovered that hardening the pinion bore to 37–43 $R_c$, prior to depositing the hard chromium plating on the interior surface of the bore 20, additionally prevents any such cracking or flaking of the hard chromium layer.

In order to accommodate the additional layer of hard chromium plating, which reduces the interior diametral dimension of the polygonal bore 20, the mating polygonal stem of the impeller 22 is sized to have a diametrical clearance of from 0.0004 to 0.0012 inch with respect to the pre-coated bore 20. This diametral clearance is sufficient to permit the hard chromium plated bore 20 to receive the polygonally dimensioned stem 22 without requiring any post-coating machining of the stem 22.

It has been discovered that, although coating the exterior surface of the polygonally dimensioned stem 22 would eliminate galling between the surfaces of the pinion 10 and the impeller 12, the 15-5 PH and the 17-4 PH stainless steel from which the impeller is manufactured is not as homogeneous a material as the AMS 6260 and the AISI 8620 alloy steel from which the pinion is manufactured. Therefore, it is relatively difficult to measure the required thickness of the coating layer of the hard chromium plating on the polygonal stem 22, as compared with measuring the coating layer on the interior surface of the bore 20.

In addition to the foregoing, it has been discovered that fretting may occur in the region of the annular surface 21. This fretting is caused by low amplitude, but high frequency sliding between the annular surface 21 and the shoulder 24. The preferred embodiment of the present invention is suitable for preventing such fretting. In this regard, it has been discovered that positioning a layer of hard chromium plating between the annular surface 21 and the shoulder 24 substantially eliminates the associated fretting which may occur between the surfaces. Additionally, it has been discovered that coating either the annular surface 21 or the shoulder 24 with a layer of hard chromium plating substantially eliminates the associated fretting which may occur between the surfaces. Finally, this fretting may be substantially eliminated by positioning a plate member, which includes a layer of hard chromium deposited thereon, between the annular surface 21 and the shoulder 24, or by positioning a plate member composed of hard chromium between the two surfaces.

While this invention has been illustrated and described in accordance with a preferred embodiment, it is recognized that variations and changes may be made therein without departing from the invention as set forth in the following claims.

Having described the invention, what is claimed is:

1. In a metallic coupling which includes a first coupling member having a dimensioned bore defined by an interior bore surface, and a second coupling member having a mating, dimensioned stem, which is defined by an exterior stem surface, and which is received by the bore, a method of preventing galling between the interior bore surface and the exterior stem surface, the method comprising the following steps:

hardening the bore to a range from 37 to 43 $R_c$; and electrodepositing on the interior bore surface a layer of hard chromium having a thickness ranging from about 0.0001 inch to about 0.0002 inch.

2. A method, as claimed in claim 1, further including the step of, prior to electrodepositing the layer of hard chromium on the interior bore surface, sizing the stem to have a diametrical clearance of from about 0.0004 to 0.0012 inch with respect to the interior bore surface.

\* \* \* \* \*